United States Patent [19]

Yamazaki

[11] Patent Number: 4,850,679
[45] Date of Patent: * Jul. 25, 1989

[54] LIQUID CRYSTAL DISPLAY PANEL AND MANUFACTURING METHOD THEREOF

[75] Inventor: Shunpei Yamazaki, Tokyo, Japan

[73] Assignee: Semiconductor Energy Laboratory Co., Ltd., Tokyo, Japan

[*] Notice: The portion of the term of this patent subsequent to May 9, 2006 has been disclaimed.

[21] Appl. No.: 140,939

[22] Filed: Dec. 28, 1987

Related U.S. Application Data

[63] Continuation of Ser. No. 796,897, Nov. 12, 1985, abandoned.

[30] Foreign Application Priority Data

Dec. 12, 1984 [JP] Japan .................................. 59-238986
Dec. 26, 1984 [JP] Japan .................................. 59-277414

[51] Int. Cl.$^4$ ............................................. G02F 1/133
[52] U.S. Cl. ................................. 350/339 R; 350/334; 350/336
[58] Field of Search ........... 350/332, 333, 334, 339 R, 350/336; 357/30 K

[56] References Cited

U.S. PATENT DOCUMENTS

| | | | |
|---|---|---|---|
| 3,654,606 | 4/1972 | Marlowe et al. | 350/332 |
| 4,223,308 | 9/1980 | Baraff et al. | 340/784 |
| 4,448,491 | 5/1984 | Okubo | 350/339 R |
| 4,560,241 | 12/1985 | Stolov et al. | 350/339 R |
| 4,582,395 | 4/1986 | Morozumi | 350/334 |
| 4,589,733 | 5/1986 | Yaniv et al. | 350/332 |
| 4,601,546 | 7/1986 | Ohta | 350/339 R |
| 4,611,224 | 9/1986 | Seki et al. | 357/30 K |
| 4,639,087 | 1/1987 | Cannella | 350/336 |

Primary Examiner—Bruce Y. Arnold
Assistant Examiner—Martin Lerner
Attorney, Agent, or Firm—Gerald J. Ferguson, Jr.

[57] ABSTRACT

A liquid crystal device includes a first and second substrate, at least one of which is transparent. A liquid crystal layer is disposed between the first and second substrates, and a plurality of first electrodes are formed on the inside of the first substrate and are arranged in an array. A plurality of second electrodes are formed on the inside of the second substrate and are also arranged in an array, the first electrodes being opposed to a corresponding first electrode to constitute one pixel therebetween. A plurality of nonlinear devices are formed on the inside of the first substrate and are provided for the pixels respectively. The nonlinear devices aligned in a line share one first conductive lead as one electrode for each nonlinear device, and a part of each first electrode functions as the other electrode of a corresponding nonlinear device. A method of manufacturing a liquid crystal device includes forming a semiconductor layer and an underlying conductive layer on a first substrate, removing the semiconductor layer and the conductive layer with a first mask other than at least one part in the form of a strip. The method includes forming an overlying conductive layer over the semiconductor strips, and removing the overlying conductive layer other than a plurality of parts which are to be first electrodes arranged in an array, together with the underlying semiconductor; and mating the first substrate with the second substrate having a plurality of second electrodes corresponding to the first electrodes, with a liquid crystal layer therebetween.

3 Claims, 22 Drawing Sheets

LIQUID CRYSTAL DISPLAY PANEL AND MANUFACTURING METHOD THEREOF

This application is a continuation of Ser. No. 796,897, filed 11/12/85, now abandoned.

BACKGROUND OF THE INVENTION

1. Field of the Invention

The present invention relates to a liquid crystal display panel which employs liquid crystal display devices each of which has a nonlinear element having a diode characteristic and a liquid crystal element. The invention also pertains to methods for the manufacture of the liquid crystal display panel.

2. Description of the Prior Art

Heretofore there has been proposed a display panel which employs m×m (where $n \geq 1$ and $m \geq 1$) liquid crystal display devices $M_{11}$ to $M_{1n}$, $M_{21}$ to $M_{2n}$, ... and $M_{m1}$ to $M_{mn}$. The liquid crystal display device $M_{ij}$ (where $i = 1, 2 \ldots n$, $j = 1, 2 \ldots n$) has a nonlinear element $U_{ij}$ having a diode characteristic and a liquid crystal element $L_{ij}$.

In this display panel, the liquid crystal display device $M_{ij}$ is connected to a row conductive layer $F_i$ and a column conductive layer $H_j$ at their intersection.

With such a display panel, an image display can be provided by driving the liquid crystal devices $M_{1l}$ to $M_{mn}$ using the row conductive layers $F_i$ to $F_m$ and the column conductive layers $H_1$ to $H_n$.

However, the conventional display panel is very complex in the structure of the nonlinear element $U_{ij}$, in the structure of the liquid crystal element $L_{ij}$ and in the structure for connecting the liquid crystal display device $M_{ij}$ to the row conductive layer $F_i$ and the column conductive layer $H_j$.

On this account, the prior art liquid crystal display panel is difficult to manufacture and expensive.

Furthermore, it is difficult to arrange m×n liquid crystal display devices $M_{11}$ to $M_{mn}$ in an (m×n) matrix form with a high density, so that resolution of the image display is relatively low.

SUMMARY OF THE INVENTION

It is therefore an object of the present invention to provide a novel liquid crystal display panel which employs liquid crystal display devices each of which has a liquid crystal element and a nonlinear element having a diode characteristic and connected in series with the nonlinear element.

Another object of the present invention is to provide novel methods for the manufacture of such liquid crystal display panel.

In accordance with an aspect of the present invention, the liquid crystal display panel comprises (a) first and second substrate members disposed opposite at a predetermined distance in substantially parallel relation to each other and (b) liquid crystal filled between the first and second substrate members.

The first substrate member comprises (a) a first substrate having an insulating surface, (b) a plurality m of stripe-like conductive layers $F_1, F_2, F_3 \ldots F_m$ arranged on the first substrate in the column direction and extending in the row direction, (c) a plurality n of layers $Q_{i1}$ to $Q_{in}$ arranged on the conductive layer $F_i$ (where $i = 1, 2 \ldots m$) in the row direction and having substantially the same width as the later, (d) a conductive layer $F_{ij}$ being formed on the layer $Q_{ij}$ (where $j = 1, 2 \ldots m$) and having the same width and length as the later, (e) a portion $D_{ij}$ of the conductive layer $F_i$ underlying the layer $Q_{ij}$, the layer $Q_{ij}$ and the conductive layer $E_{ij}$ constituting a laminate member $A_{ij}$, (f) insulating layers $K_{ij}$ and $K_{ij}'$ each formed over the entire areas of side faces of the laminate member $A_{ij}$ (or (f)' a insulating layers $K_i$ formed on the first substrate and extending between the laminate member $A_{i1}$ to $A_{in}$ and $A_{(i+1)1}$ to $A_{(i+1)n}$) and (g) a conductive layer $C_{ij}$ formed on the first substrate and corresponding to the laminate member $A_{ij}$, the conductive layer $C_{ij}$ having substantially the same width as the length of the laminate member $A_{ij}$ and extending on the side face of the insulating layer $K_{ij}$ and onto the insulating layer $K_{ij}$, the laminate member $A_{ij}$ and the insulating layer $K_{ij}'$, and the both side faces defining the width of the conductive layer $C_{ij}$ being substantially in agreement with the both side faces defining the length of the laminate member $A_{ij}$ (or (g)' a conductive layer $C_{ij}$ formed on the insulating layer $K_i$ and corresponding to the laminate member $A_{ij}$, the conductive layer $C_{ij}$ having substantially the same width as the length of the laminate member $A_{ij}$ and extending onto the laminate member $A_{ij}$, and the both side faces defining the width of the conductive layer $C_{ij}$ being substantially in agreement with the both side faces defining the length of the laminate member $A_{ij}$).

The second substrate member comprises (a) a second substrate having an insulating surface, and (b) a plurality n×q (where q is an integer equal to or greater than (1) of stripe-like conductive layers $H_{11}, H_{12} \ldots H_{1q}$; $H_{21}, H_{22} \ldots H_{2q}$; ... and $H_{n1}, H_{n2} H_{n3} \ldots H_{nq}$ sequentially arranged on the second substrate in the row direction and extending in the column direction, the conductive layers $H_{j1}$ to $H_{jq}$ being opposite the conductive layers $C_{1j}$ to $C_{mj}$.

The laminate member $A_{ij}$ forms a nonlinear element $U_{ij}$. The conductive layer $H_{jr}$ (where $r = 1, 2, \ldots q$), a portion $B_{ijr}$ of the conductive layer $C_{ij}$ confronting the conductive layer $H_{jr}$ and the portion of the liquid crystal filled between the conductive layer $H_{jr}$ and the portion $B_{ijr}$ forms a liquid crystal element $L_{ijr}$.

According to such a liquid crystal display panel of the present invention, the liquid crystal element $L_{ijr}$ can be driven by applying a driving signal to the liquid crystal display element $M_{ijr}$ via the row conductive layer $F_i$ and the column conductive layer $H_{jr}$. Accordingly, the liquid crystal display panel provides an image display.

Since the liquid crystal element $L_{ijr}$ is formed by the conductive layer $H_{jr}$, the portion $B_{ijr}$ of the conductive layer $C_{ij}$ facing the conductive layer $H_{jr}$ and the portion of the liquid crystal between the conductive layer $H_{jr}$ and the portion $B_{ijr}$, as mentioned above, the liquid crystal element $L_{ijr}$ is simple in structure.

Furthermore, the nonlinear element $U_{ij}$ is formed by the aforementioned laminate member $A_{ij}$, and hence is simple in construction.

The liquid crystal display panel of the present invention is simple-structured in that the liquid crystal display element $L_{ijr}$ and the nonlinear element $U_{ij}$ are interconnected in series via the conductive layer $C_{ij}$ to constitute the liquid crystal display device $M_{ijr}$ and in that the liquid crystal display device $M_{ijr}$ is connected at one side to the row conductive layer $F_i$ forming the other electrode of the nonlinear element $U_{ij}$ and at the other side to the column conductive layer $H_{jr}$ forming the other electrode of the liquid display element $L_{ijr}$.

Accordingly, the liquid crystal display panel of the present invention is far simpler in structure than is conventional, in consequence of which $m \times (m \times q)$ display crystal elements $M_{111}$ to $M_{mnq}$ can be arranged in an $m \times (n \times q)$ matrix form with a high density, ensuring to provide an image display with high resolution.

Moreover, according to the present invention, the liquid crystal display panel which has the aforesaid excellent feature can be produced by a manufacturing method of the present invention which includes a step of (A) preparing a first substrate member, (B) preparing a second substrate member, (C) turning the second substrate member upside down and disposing the first and second substrate members in opposing and substantially parallel relation to each other and (D) filling liquid crystal in the gap defined by the first and second substrate members.

The step of preparing a first substrate member which includes the steps of (a) forming, on a first substrate, a laminate member A composed of a conductive layer F, a layer Q and a conductive layer E laminated in this order, (b) patterning the laminate member A into a plurality m of stripe-like laminate members $A_1$ to $A_m$ sequentially arranged in the column direction and extending in the row direction, (c) depositing a insulating layer K having a thickness smaller than the laminate members $A_1$ to $A_m$ over the entire area of the first substrate to cover the laminate members $A_1$ to $A_m$ (or (C)' depositing a insulating layer K having a thickness larger than the laminate members $A_1$ to $A_m$ over the entire area of the first substrate to cover the laminate members $A_1$ to $A_m$), (d) selectively etching away the insulating layer K to form on both sides of the laminate member $A_i$ (where $i = 1, 2 \ldots m$) defining the width of the second laminate member $A_i$ (or (d)' selectively etching away the insulating layer K to form an insulating layer $K_i$ extending between the laminate members $A_i$ and $A_{(i+1)}$ and flush therewith) (e) forming a conductive layer C over the entire area of the first substrate to cover the laminate members $A_1$ to $A_m$ and the insulating layers $K_1$ to $K_m$ and $K_1'$ to $K_m'$ (or (e)' forming a conductive layer C over the entire area of the first substrate to cover the laminate members $A_1$ to $A_m$ and the insulating layers $K_1$ to $K_m$) and (f) patterning the conductive layer C, the second conductive layers $E_1$ to $E_m$ and the layers $Q_1$ to $Q_m$ to form conductive layers $C_{i1}$ to $C_{in}$ extending from the substrate onto the insulating layer $K_i$ and the laminate member $A_i$ passing on the side face of the insulating layer $K_i$, layers $Q_{i1}$ to $Q_{in}$ and conductive layers $E_{i1}$ to $E_{in}$, a portion $D_{ij}$ of the conductive layer $F_i$ underlying the layer $Q_{ij}$, the layer $Q_{ij}$ and the conductive layer $E_{ij}$ constituting the laminate member $A_{ij}$ (or (f)' patterning the conductive layer C, the second conductive layers $E_1$ to $E_m$ and the layers $Q_1$ to $Q_m$ to form conductive layers $C_{i1}$ to $C_{in}$ extending from the insulating layer $K_i$ onto the laminate member $A_i$, layers $Q_{i1}$ to $Q_{in}$ and conductive layers $E_{i1}$ to $E_{in}$, a portion $D_{ij}$ of the conductive layer $F_i$ underlying the layer $Q_{ij}$, the layer $Q_{ij}$ and the conductive layer $E_{ij}$ constituting the laminate member $A_{ij}$).

The step of preparing a second substrate member includes the steps of forming, on a second substrate having an insulating surface, a plurality $n \times q$ (where q is an integer equal to or greater than 1) conductive layers $H_{11}, H_{12} \ldots H_{1q}; H_{21}, H_{22} \ldots H_{2q}; H_{31}, H_{32} \ldots H_{3q}; \ldots$ and $H_{n1}, H_{n2} \ldots H_{nq}$ sequentially arranged in the row direction and extending in the column direction, the conductive layers $H_{j1}, H_{j2}, \ldots$ and $H_{iq}$ corresponding to the conductive layers $C_{1j}, C_{2j}, \ldots$ and $C_{mj}$ of the first substrate member.

The manufacturing method of the present invention requires only three masks for the fabrication of the liquid crystal display, that is, one for the formation of the laminate member $A_1$ to $A_m$, one for the formation of the conductive layers $C_{11}$ to $C_{mn}$ and the laminate members $A_{11}$ to $A_{mn}$ and one for the formation of the conductive layers $H_{11} \sim H_{1r}$ to $H_{n1} \sim H_{nr}$.

Accordingly, the liquid crystal display panel having the abovesaid advantages can easily be manufactured at low cost.

Other objects, features and advantages of the present invention will become more fully apparent from the following detailed description taken in conjunction with the accompanying drawings.

DESCRIPTION OF THE PREFERRED EMBODIMENTS

Figure 1:
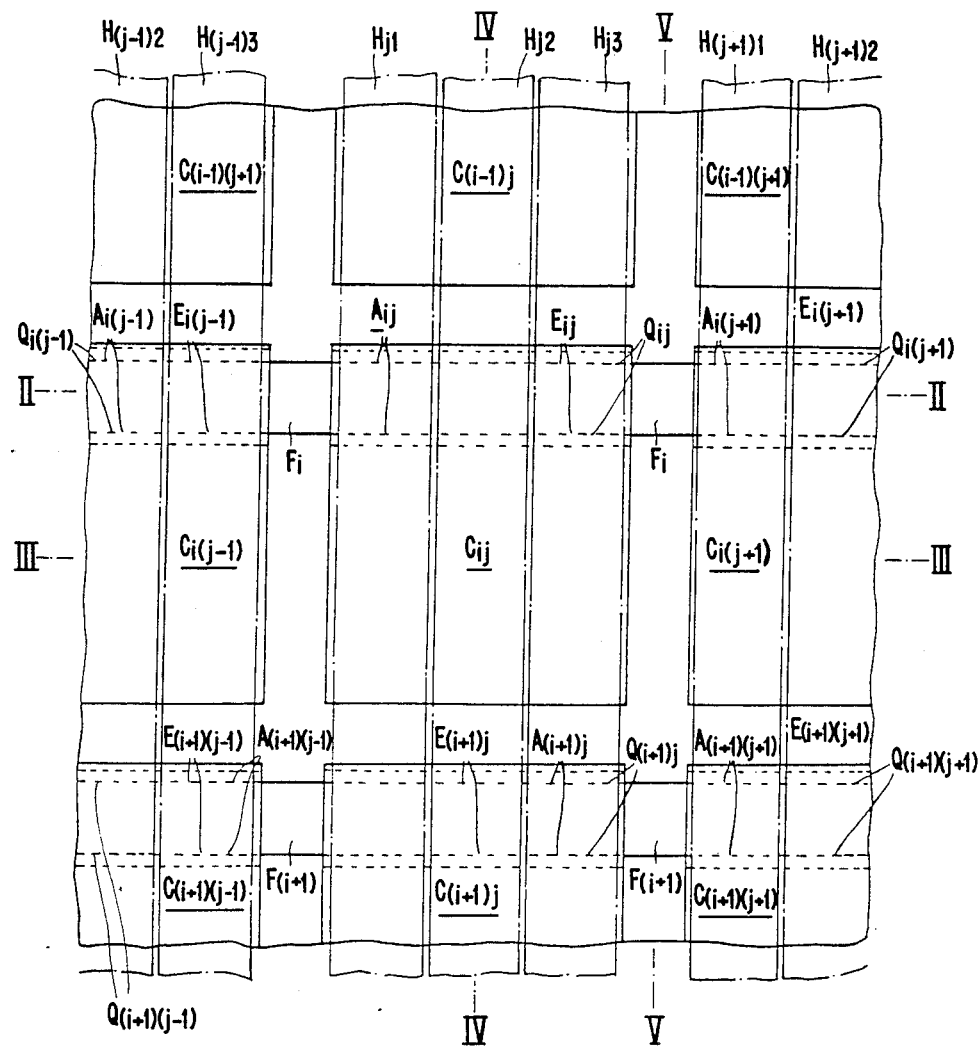
FIG. 1 is a plan view schematically illustrating an embodiment of the liquid crystal display panel of the present invention.
Figure 2:
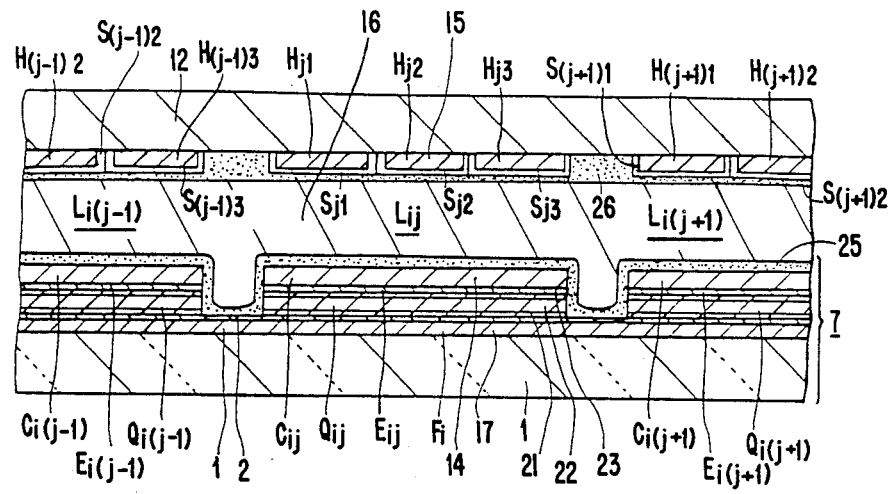
FIGS. 2, 3, 4 and 5 are sectional views respectively taken on the lines II—II, III—III, IV—IV and V—V in FIG. 1.
Figure 3:
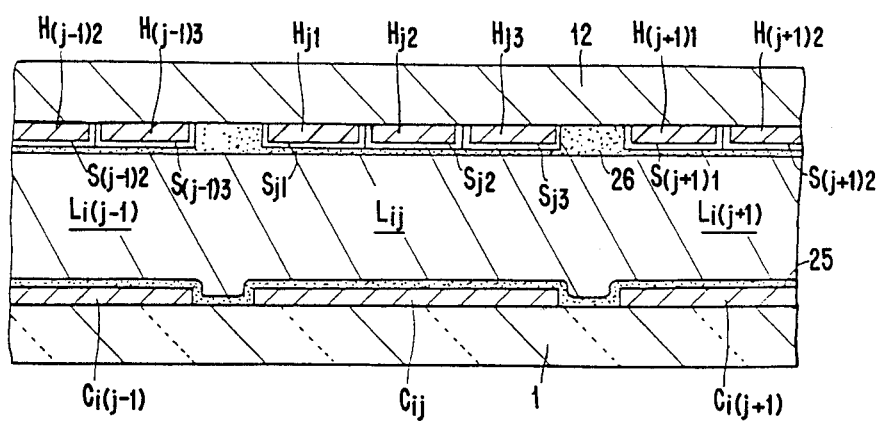
Figure 4:
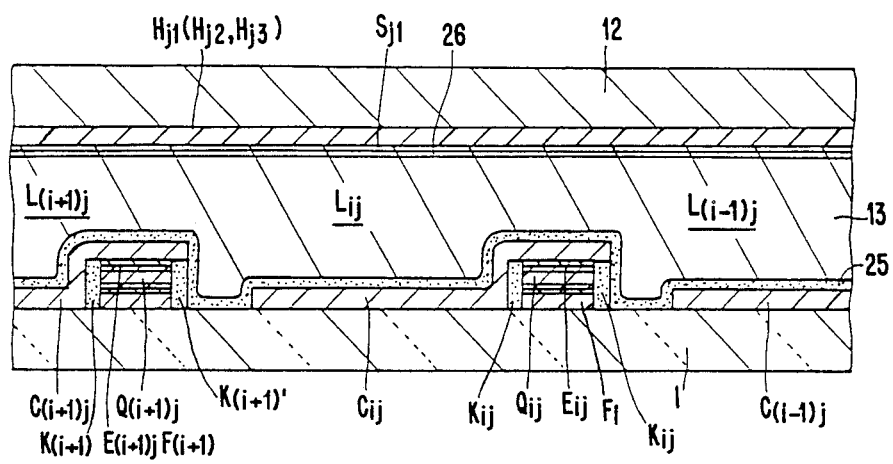
Figure 5:
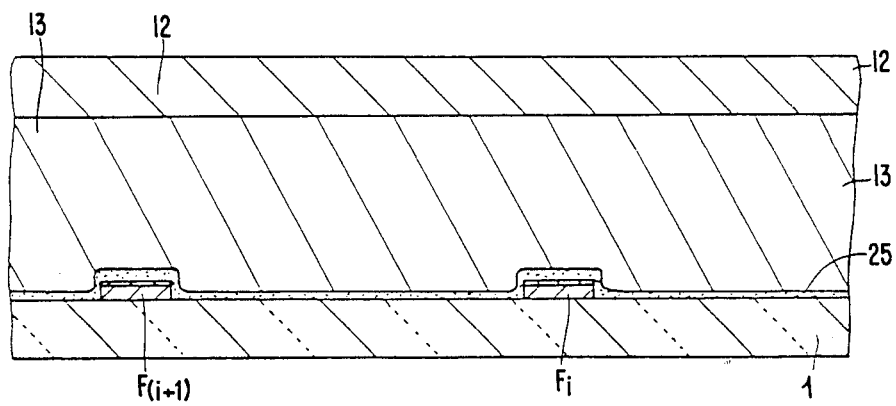

FIGS. 1 to 5 illustrate an embodiment of the liquid crystal display panel of the present invention, in which a substrate 1 has an insulating surface. The substrate 1 is formed of, for instance, alkaline free glass.

The substrate 1 has sequentially arranged thereon in column direction a plurality m of row conductive layers $F_1, F_2 \ldots F_m$. The row conductive layer $F_i$ may preferable be composed of a layer 2 formed of, for example, aluminum and a nontransparent layer 3 formed of, for instance chromium.

The row conductive layer $F_i$ has sequentially formed thereon a plurality of n layers $Q_{i1}, Q_{i2} \ldots Q_n$ each of which is formed, for example, non-single-crystal semiconductor. The layers $Q_{i1}, Q_{i2} \ldots Q_{in}$ have same width as the row conductive layer $F_i$.

The layer $Q_{ij}$ (where i=1, 2 ... m and j=1, 2 ... n) may have, for example, an n-i-n type structure composed of an n-type layer, an i-type layer and an n-type layer, an n-i-p (or p$^-$)-i-n type structure composed of an n-type layer, an i-type layer, a p(or p$^-$)-type layer, an i-type layer and an n-type layer, a p-i-p type structure composed of a p-type layer, an i-type layer and a p-type layer, or a p-i-n(or n$^-$)-i-p type structure composed of a p-type layer, an i-type layer, an n(or n$^-$)-type layer, an i-type layer and an p-type layer. The layer $Q_{ij}$ also may be only a very thin insulating layer which may pass tunnel current. But FIGS. 1 to 5 show the case where the layer $Q_{ij}$ has the n-i-n type structure. For the sake of brevity, the following description will be made in connection with the case where the layer $Q_{ij}$ has the n-i-n type structure.

The layer $Q_{ij}$ has an n-type non-single-crystal silicon layer 21 formed on the row conductive layer $F_i$, an i-type layer 22 of non-single-crystal semconductor formed on the layer 21 and an n-type non-single-crystal silicon layer 23 formed on the layer 22. The layer 22 is formed principally of silicon but contains carbon (C), nitrogen (N) or oxygen (O) in an amount of 1/10 or less relative to the silicon, and hence is formed of non-single-crystal semiconductor expressed by $Si_xC_{1-x}$ (where $0<x<1$).

The layer $Q_{ij}$ is covered over the entire area of its top surface with a conductive layer $E_{ij}$. The conductive layer $E_{ij}$ is formed of, for instance, chromium.

The part of the conductive layer $F_i$ underlying the layer $Q_{ij}$, the layer $Q_{ij}$ and the conductive layer $E_{ij}$ make up a layer member $A_{ij}$.

The layer member $A_{ij}$ are covered over the entire area of its opposite side surfaces with insulating layers $K_{ij}$ and $K_{ij}'$, respectively. The insulating layers $K_{ij}$ and $K_{ij}'$ are formed of, for instance, silicon nitride or silicon oxide and have 0.1 to 0.5 μm in thickness.

The substrate 1 has arranged thereon in a matrix form m×n (where m>1, and n>1) conductive layers $C_{11}$ to $C_{1n}$, $C_{21}$ to $C_{2n}$, $C_{31}$ to $C_{3n}$, ... and $C_{m1}$ to $C_{mn}$.

The conductive layer $C_{ij}$ (where i=1, 2, ... m and j=1, 2, ... n) is rectangular in shape and has a relatively large area, for example, 100 μm wide and 150 μm long.

The conductive layer $C_{ij}$ extends on the layer member $A_{ij}$ i.e. the conductive layer $E_{ij}$ and the insulating layer $K_{ij}$ and $K_{ij}'$ through the side surface of the insulating layer $K_{ij}$ and make contact with the conductive layer $E_{ij}$. The conductive layer $C_{ij}$ has substantially same width as the long of the layer member $A_{ij}$ i.e. the conductive layer $E_{ij}$ and is formed of, for instance, chromium and is nontransparent. In this case, the opposing side surfaces of the conductive layer $C_{ij}$, which determine the width of the conductive layer $C_{ij}$ are substantially aligned with the opposing side surfaces of the layer member $A_{ij}$, which determine the long of the layer member $A_{ij}$.

Furthermore a relatively thin insulation protecting layer 25 is deposited on the substrate 1 to cover the conductive layer $C_{11}$ to $C_{mn}$, the active layers $A_{11}$ to $A_{1n}$, $A_{21}$ to $A_{2n}$ ... $A_{m1}$ to $A_{mn}$, the insulating layer $K_{11}$ to $K_{mn}$ and $K_{11}'$ to $K_{mn}'$ and parts of the row conductive layers $F_1, F_2 ... F_m$ which are not covered with the conductive layers $C_{11}$ to $C_{1n}, C_{21}$ to $C_2 ... C_{m1}$ to $C_{mn}$.

The conductive layers $F_1$ to $F_m$, the layer members $A_{11}$ to $A_{mn}$, the insulating layers $K_{11}$ to $K_{mn}$ and $K_{11}'$ to $K_{mn}'$ and the conductive layers $C_{11}$ to $C_{mn}$ make up a substrate member 7.

The substrate member 7 is formed, for example, as follows:

A conductive layer F which will ultimately form the row conductive layers $F_1$ to $F_m$, a layer Q which will ultimately form the layers $Q_{11}$ to $Q_{mn}$ and a conductive layer E which will ultimately form the conductive layers $E_{11}$ to $E_{mn}$ are deposited in that order on the substrate 1, as shown in FIGS. 9A to 9E. The conductive layer F, the layer Q and the conductive layer E make up a layer member A which will ultimately form the layer members $A_{11}$ to $A_{mn}$.

The conductive layer F may be formed by a known method, for instance, a sputtering or electron beam evaporation process.

The layer Q also may be formed by a known method, for example, a CVD, plasma CVD or photo CVD method.

In my experiment, the substrate 1 formed thereon the conductive layer F was loaded through a loading and unloading chamber into a first reaction chamber, wherein a glow discharge was produced over the substrate 1 at a high frequency of 13.56 MHz in an atmosphere containing silane SiH$_4$, phosphine PH$_3$ and hydrogen, with the substrate temperature held in the range of 200° to 250° C. As a result of this, an n-type microcrystalline silicon layer, which had a conductivity of $10^{-2}$ to $10^2 (\Omega m)^{-1}$ and contained hydrogen as s recombination center neutralizer, was deposited 300 to 1000 Å thick on the conductive layer F. Next, the substrate 1 was moved from the first reaction chamber into the next second reaction chamber, wherein a gas mixture of silane $Si_mH_{2m+2}$ (where m=1, 2, 3, ... ) (for example, SiH$_4$) and methyl silane $SiH_n(CH_3)_{4-n}$ (where n=1, 2, 3) was discharged into a plasma, by which an i-type non-single-crystal silicon layer of $Si_xC_{1-x}$ was deposited 0.2 to 1 μm thick on the n-type layer. After this, the substrate 1 was returned from the second reaction chamber to the first reaction chamber, wherein another n-type layer similar to the above n-type layer was deposited by the same method on the i-type non-single-crystal silicon layer, thus obtaining the laminate member Q having the n-i-n type structure.

The conductive layer E may also be formed by a known method, for instance, a sputtering or electron beam evaporation process.

Next, the layer member A is subjected to a known pattern process using a first mask, providing m layer members $A_1$ to $A_m$ of the same pattern as row the conductive layers $F_1$ to $F_m$, as shown in FIGS. 10A to 10E.

Next, a insulating layer K which will ultimately form the insulating layer $K_{11}$ to $K_{mn}$ and $K_{11}'$ to $K_{mn}'$ and which is relatively thin than the layer member $A_1$ to $A_m$ is deposited by a known method, for example, plasma CVD method on the entire surface of the substrate 1 to cover the active layers $A_1$ to $A_m$, as shown in FIGS. 11A to 11E.

Next, the insulating layer K is selectively etched away by a known method, for example, a plasma etching method to form insulating layers $K_i$ and $K_i'$ on both sides of the laminate member $A_i$ difining the width of the laminate member $A_i$, as shown in FIGS. 12A to 12E.

Next, a conductive layer is diposited on the entire area of the substrate 1 to cover the laminate member $A_1$ to $A_m$ and the insulating layers $K_1$ to $K_m$ and $K_1'$ to $K_m'$ as shown in FIGS. 13A to 13E.

Next, the conductive layer C, the layer $Q_1$ to $Q_m$ and the conductive layer $E_1$ to $E_m$ of the layer members $A_1$ to $A_m$ are patterned by a known method using a second mask into the conductive layers $C_{11}$ to $C_{mn}$, the layers $Q_{11}$ to $Q_{mn}$ and the conductive layers $E_{11}$ to $E_{mn}$ as shown in FIGS. 14A to 14E. In this case, the conductive layer $F_1$ to $F_m$ are not patterned. The layer $Q_{ij}$, the part of the conductive layer $F_i$ underlying the layer $Q_{ij}$ and the conductive layer $E_{ij}$ make up the laminate member $A_{ij}$.

Next, the insulating layers $K_1$ to $K_m$ and $K_1'$ to $K_m'$ are selectively etched away by a known method into the insulating layer $K_{11}$ to $K_{mn}$ and $K_{11}'$ to $K_{mn}'$.

Next, the thin insulation protecting layer 25 is deposited on the entire surface of the substrate 1 to cover the conductive layers $C_{11}$ to $C_{mn}$, the layer members $A_{11}$ to $A_{mn}$, the insulating layers $K_{11}$ to $K_{mn}$ and $K_{11}'$ to $K_{mn}'$ and the part of the conductive layer $F_1$ to $F_m$ which are not covered with the conductive layers $C_{11}$ to $C_{nm}$.

Referring now back to FIGS. 1 to 5, another substrate member 11, which is different from the aforementioned substrate member 7 is provided.

The substrate member 11 has, on a substrate 12 corresponding to the substrate 1, a plurality of n×q (where $q \geq 1$, in this instance q=3) sequentially arranged column conductive layers $H_{11}$, $H_{12}$ and $H_{13}$; $H_{21}$, $H_{22}$ and $H_{23}$; ... $H_{n1}$, $H_{n2}$ and $H_{n3}$ which are arranged opposing relation to the conductive layers $C_{11}$ to $C_{m1}$; $C_{12}$ to $C_{m2}$; ... $C_{1n}$ to $C_{mn}$, respectively and extend in the column direction. The column conductive layer $H_{j1}$, $H_{j2}$ and $H_{j3}$ can be obtained by forming a conductive layer through a known method on the substrate 12 and then patterning the conductive layer through a third mask.

The column conductive layers $H_{j1}$, $H_{j2}$ and $H_{j3}$ are covered over entire surfaces thereof with red, green and blue filters $S_{j1}$, $S_{j2}$ and $S_{j3}$, respectively.

Furthermore, a insulation protecting layer 26 formed of, for instance, organic region is deposited on the entire surface of the substrate 12 by a known method, for example, coating to cover the filters $S_{11}$ to $S_{n1}$, $S_{12}$ to $S_{n2}$ and $S_{13}$ to $S_{n3}$.

The substrate member 11 is disposed upside down by a suitable support means (not shown) in opposing relation to the top of the substrate member 7 in parallel thereto. In this instance, the conductive layers $C_{1j}$ to $C_{mj}$ of the substrate member 7 and the column conductive layers $H_{j1}$, $H_{j2}$ and $H_{j3}$ of the substrate member 11 are held face-to-face with each other.

A space defined by the substrate members 7 and 11 is filled with liquid crystal 13.

In the structure described above in conjunction with FIGS. 1 through 5, a part 14 of the conductive layer $C_{ij}$ on the substrate 1 and a part 15 of the conductive layer $H_{jr}$ (where r=1, 2, 3) on the substrate 12, which are face-to-face with each other and a part 16R of the liquid crystal 13 between the part 14 of the conductive layer $C_{ij}$ and the part 15 of the conductive layer $H_{jr}$ constitute a liquid crystal element $L_{ijr}$ which employs the parts 14 and 15 as its electrodes $B_{ijr}$ and $B_{ijr}'$, respectively.

When low voltages are applied across the part 14 serving as electrode $B_{ijr}$ of the conductive layer $C_{ij}$ and the part 15 serving as electrode $B_{ijr}'$ of the conductive layer $H_{jr}$, the liquid crystal element $L_{ije}$ remain opaque, but when high voltages are applied, it become transparent.

Figure 6:
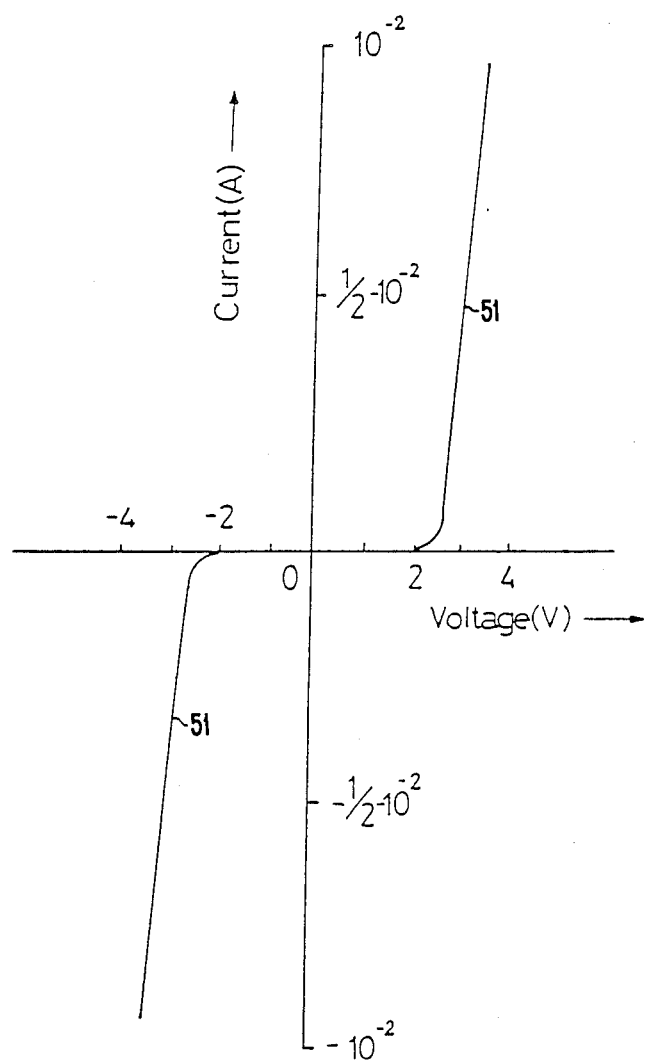
FIG. 6 is a graph showing the voltage (V)—current(I) characteristics of the nonlinear element used in the liquid crystal display panel of the present invention depicted in FIGS. 1 to 5, in comparison with V-I characteristics of a conventional nonlinear element.
Figure 7:
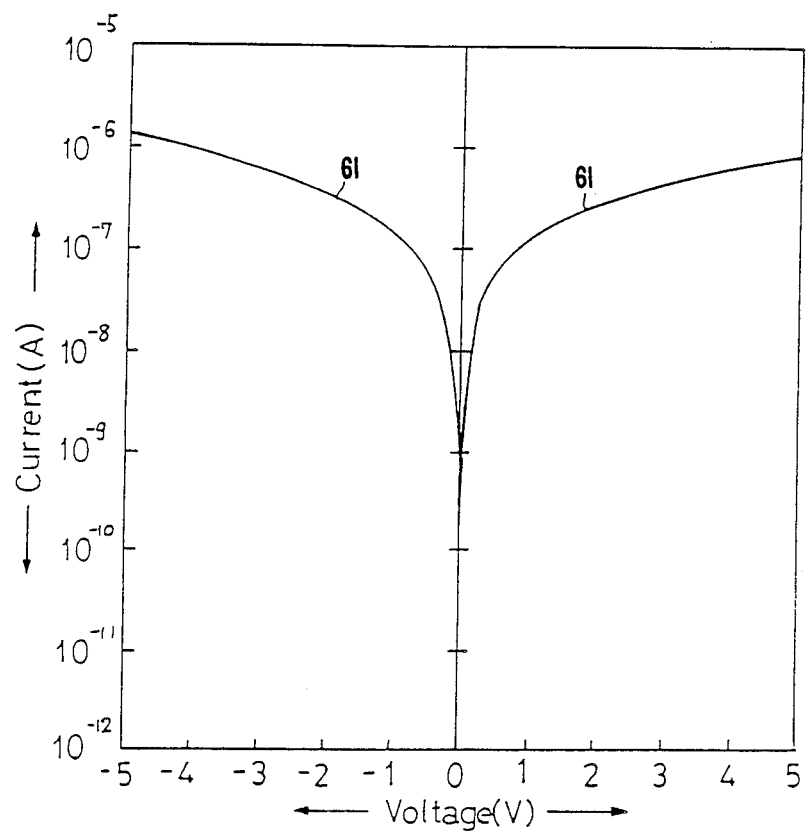
FIG. 7 is a graph showing a part of the V-I characteristics depicted in FIG. 6.

The layer member $A_{ij}$ constitute a nonlinear element $U_{ij}$ which employs the part 17 of the conductive layer $F_i$ underlying the layer $Q_{ij}$ and the conductive layer $E_{ij}$ as its electrodes $D_{ij}$ and $D_{ij}'$, respectively. The element $U_{ij}$ presents such a nonlinear voltage(V)-current(A) characteristic curves 51 and 61 as shown in FIGS. 6 and 7. The element $U_{ij}$ has an offset voltage which is intermediate between the voltage that makes the liquid crystal element $L_{ijr}$ transparent and nontransparent, respectively.

The liquid crystal element $L_{ijr}$ and the nonlinear element $U_{ij}$ are connected in series with each other, and hence make up a liquid crystal display device $M_{ijr}$.

According to the arrangement described above with respect to FIGS. 1 through 5, the electrode $B_{ijr}$ of the liquid crystal element $L_{ijr}$ and the electrode $D_{ij}'$ of the nonlinear element $U_{ij}$ are common each other. The electrode $B_{ijr}'$ of the liquid crystal elements $L_{ijr}$ of the liquid crystal display devices $M_{ijr}$ is connected to the column conductive layer $H_{jr}$ and the electrode $D_{ij}$ of the nonlinear element $U_{ij}$ is connected to the conductive layer $F_i$. Furthermore, the column conductive layer $H_{j1}$, $H_{j2}$ and $H_{j3}$ are covered with the red, green and blue filters $S_{j1}$, $S_{j2}$ and $S_{j3}$, respectively.

Figure 8:
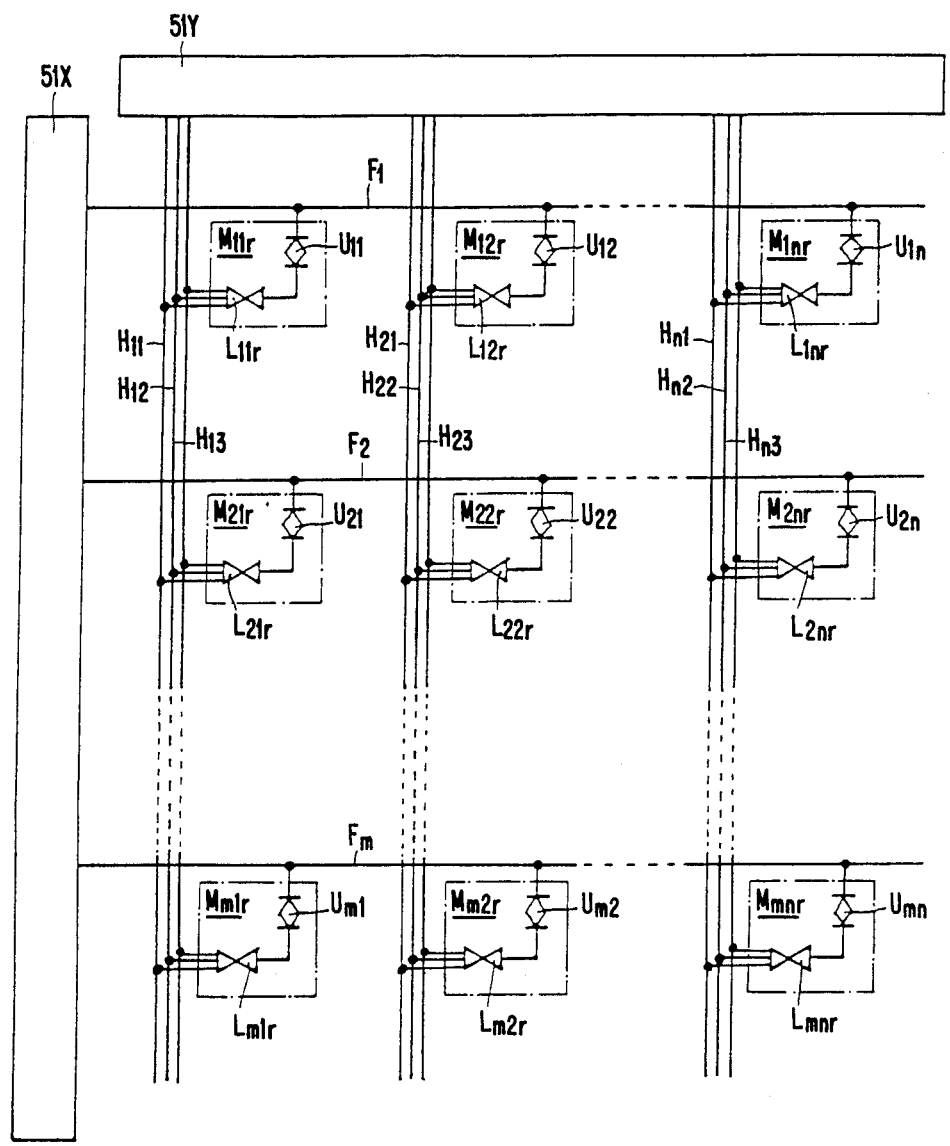
FIG. 8 is an electrical connection diagram of the liquid crystal display panel of the present invention shown in FIGS. 1 to 5.
Figure 9A:
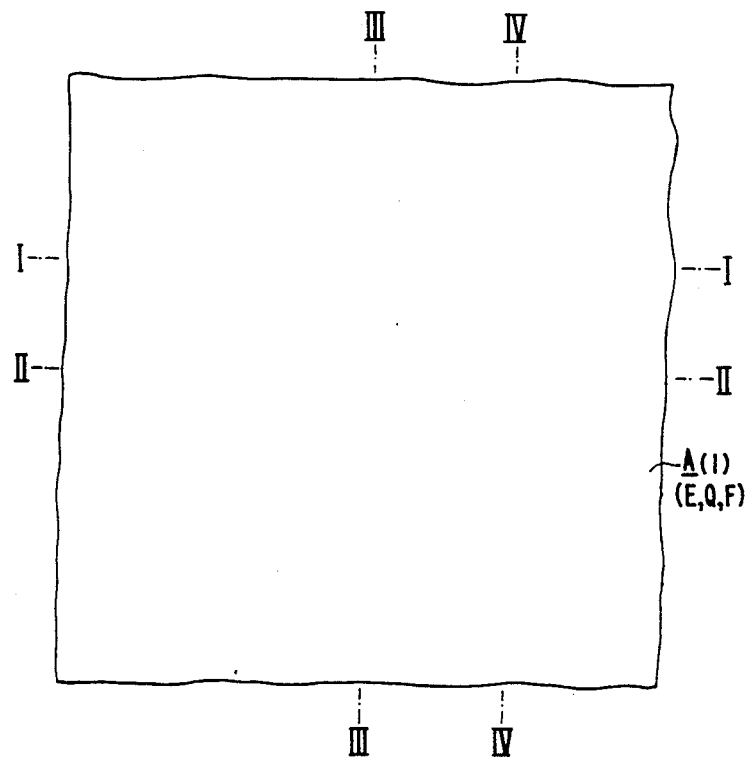
FIGS. 9 to 14 are a diagrams for explaining the manufacture of the liquid crystal display panel by the method of the present invention.
Figure 9B:
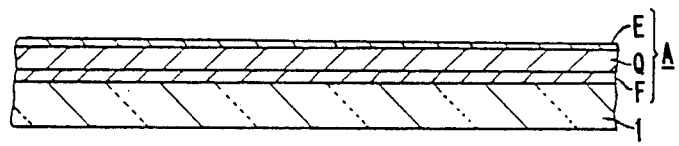
Figure 9C:
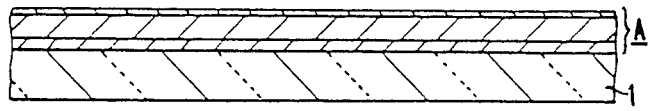
Figure 9D:
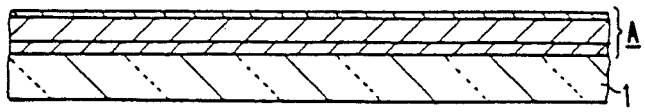
Figure 9E:
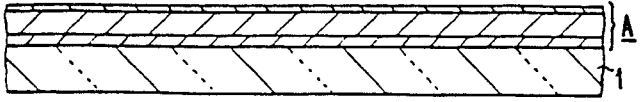
Figure 10A:
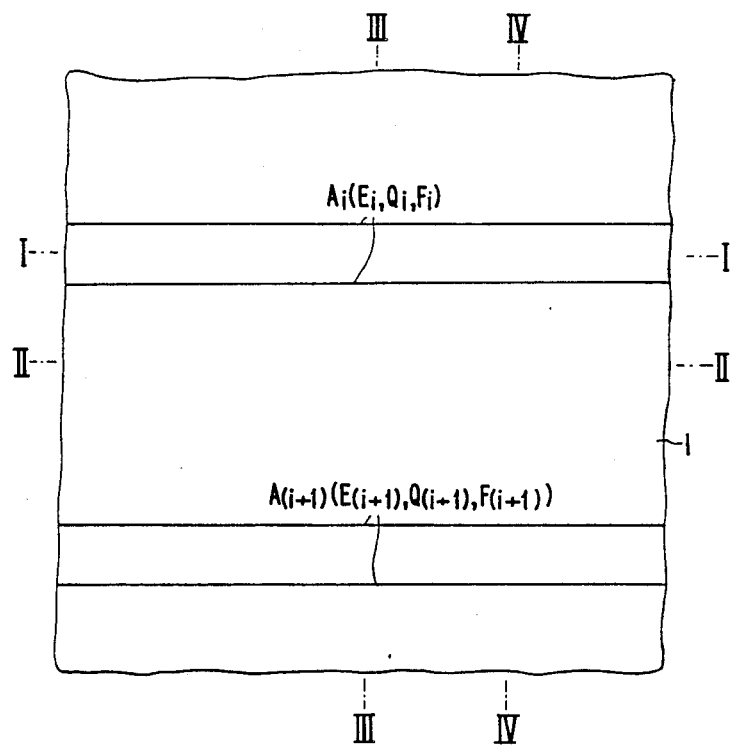
Figure 10B:
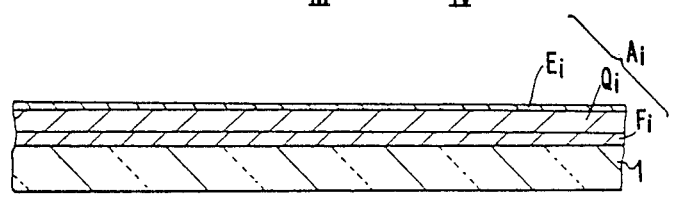
Figure 10C:
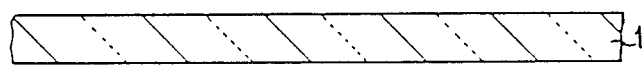
Figure 10D:
Figure 10E:
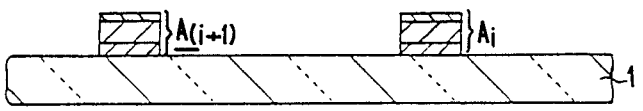
Figure 11A:
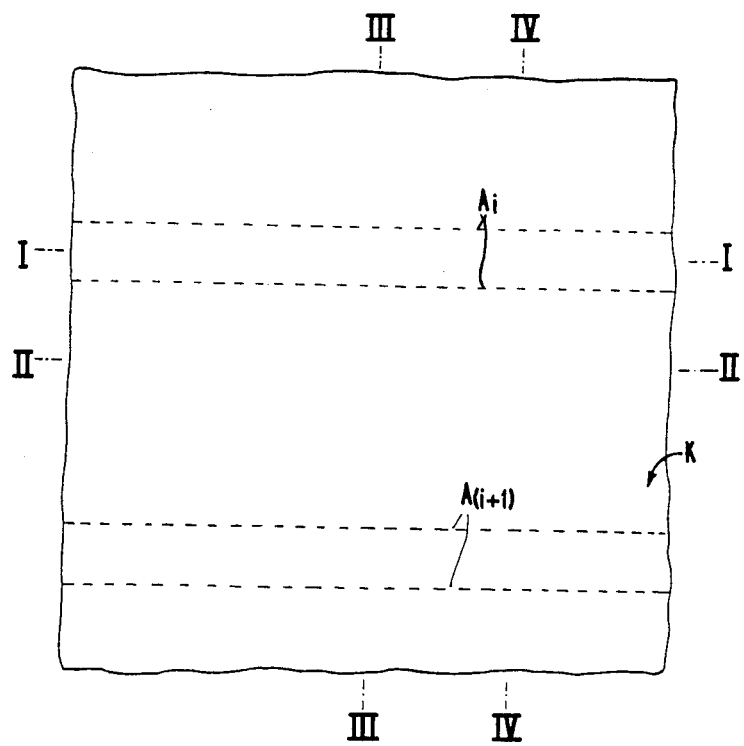
Figure 11B:
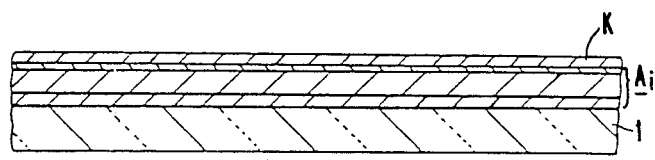
Figure 11C:
Figure 11D:
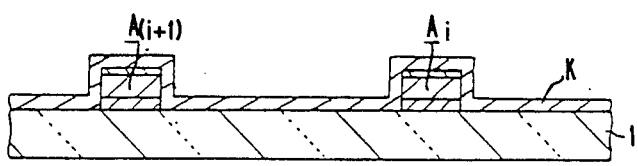
Figure 11E:
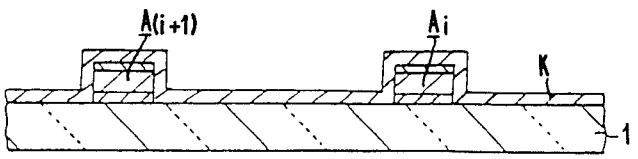
Figure 12A:
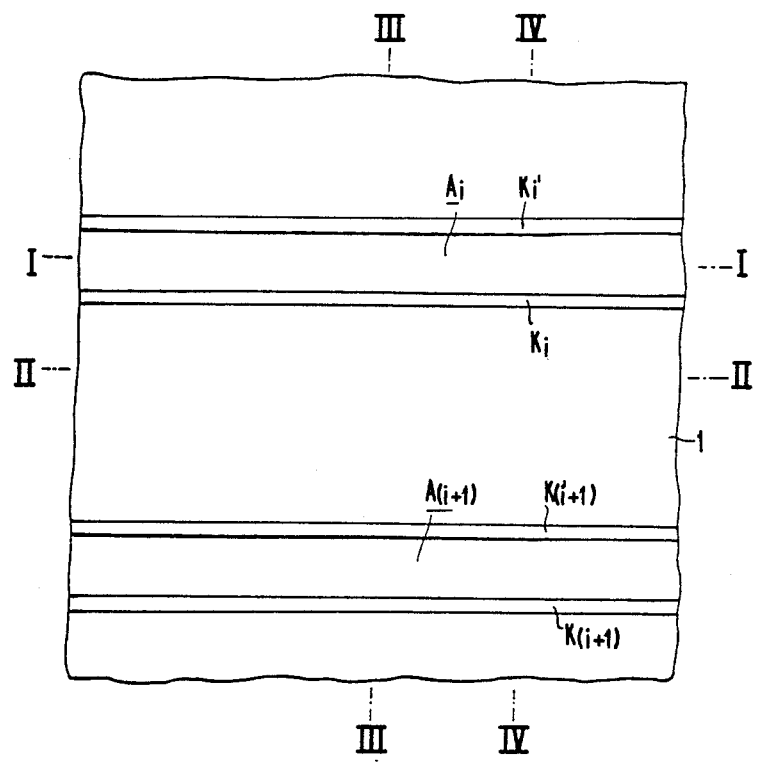
Figure 12B:
Figure 12C:
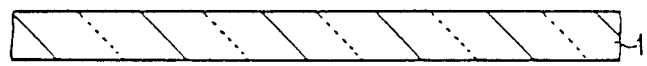
Figure 12D:
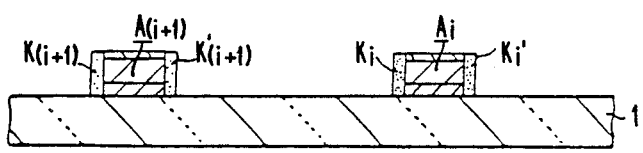
Figure 12E:
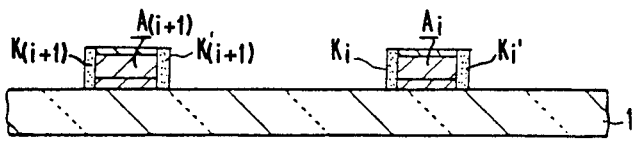
Figure 13A:
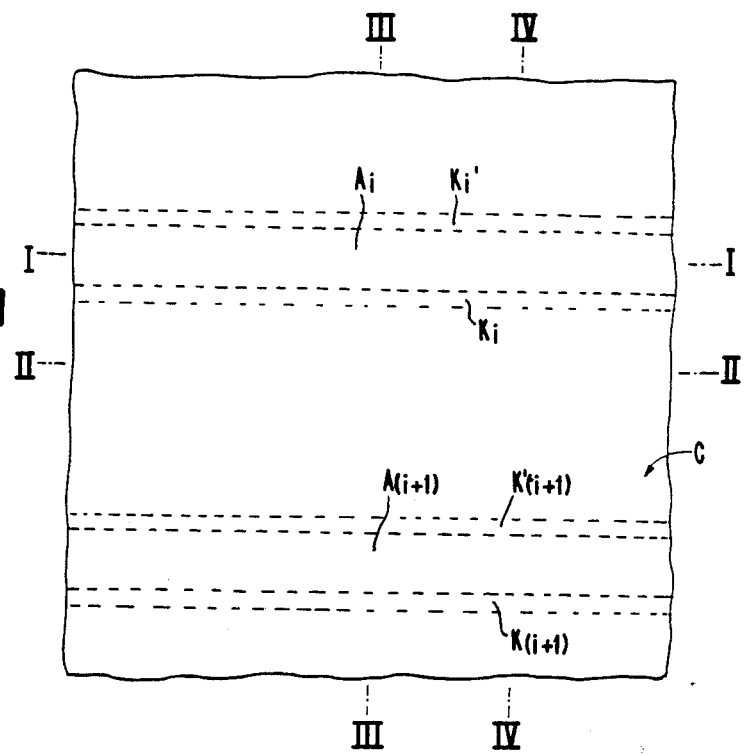
Figure 13B:
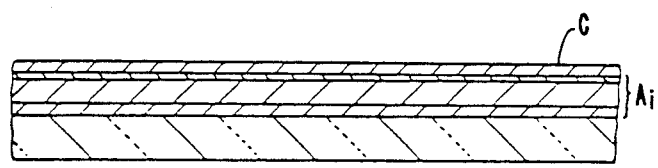
Figure 13C:
Figure 13D:
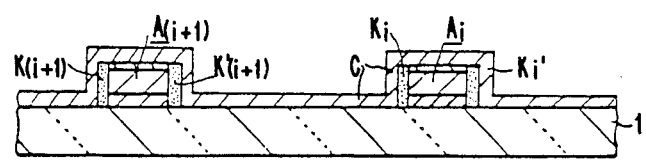
Figure 13E:
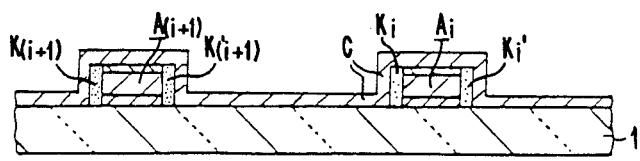
Figure 14A:
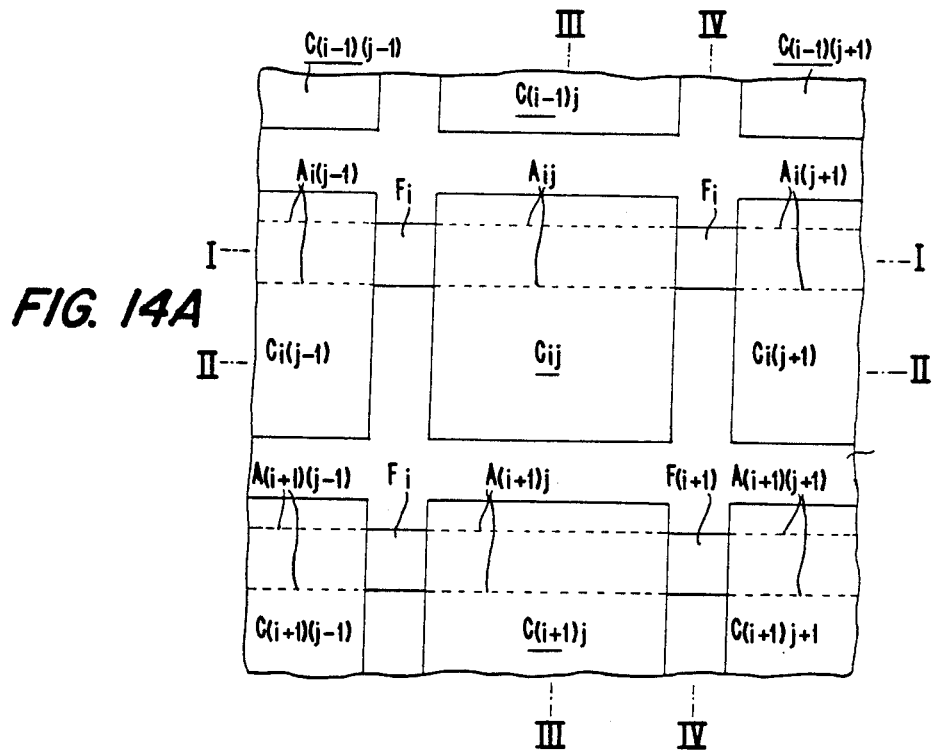
Figure 14B:
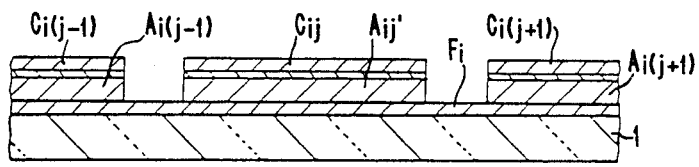
Figure 14C:
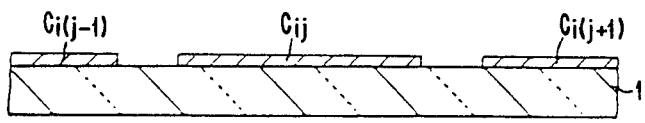
Figure 14D:
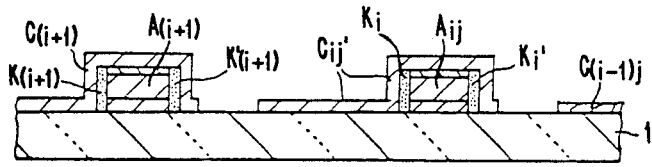
Figure 14E:
Figure 15:
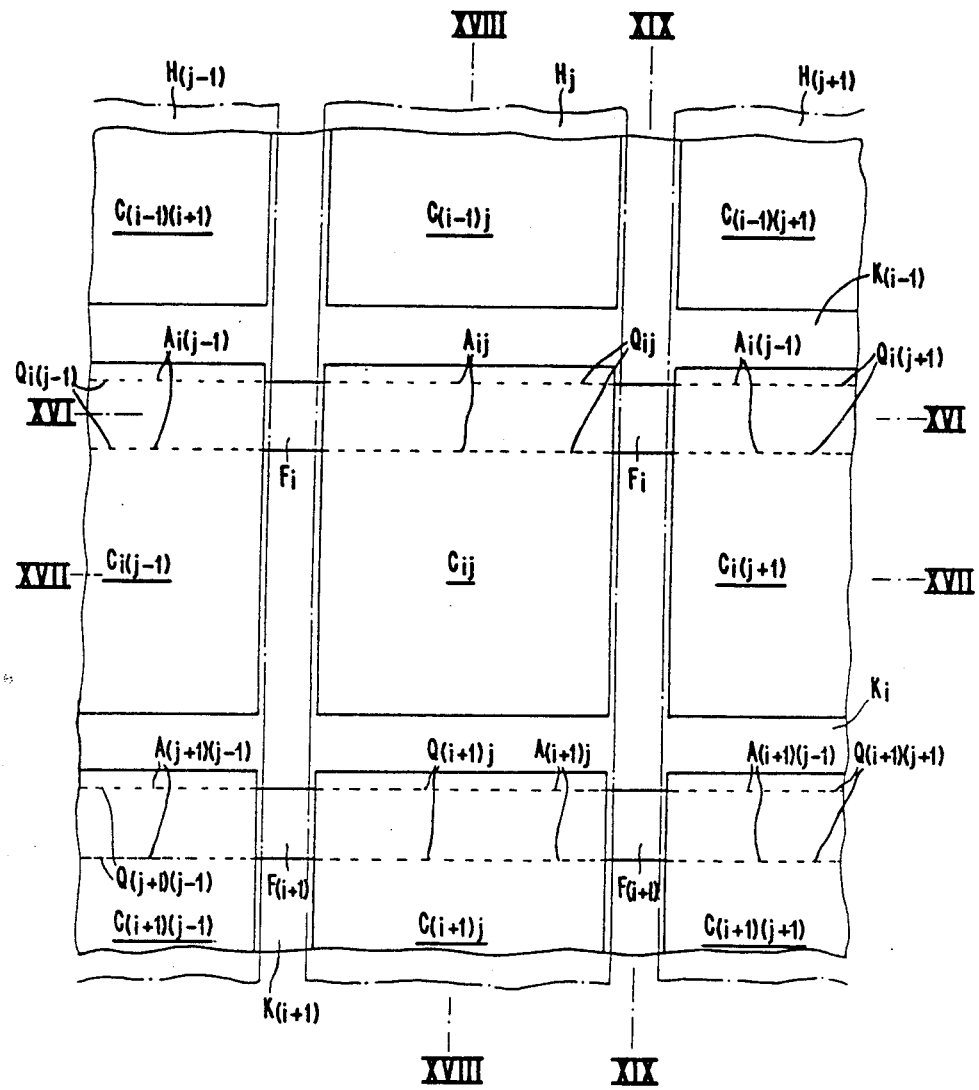
FIG. 15 is a plan view illustrating another embodiment of the liquid crystal display panel of the present invention.
Figure 16:
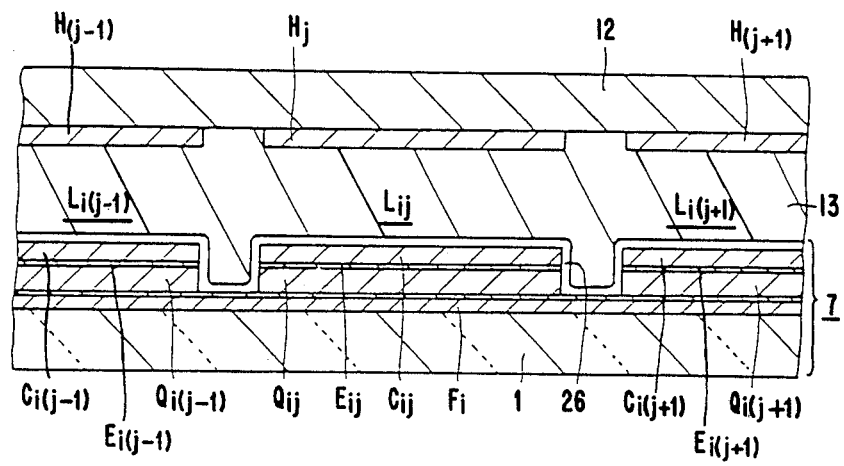
FIGS. 16, 17 and 18 are sectional views respectively taken on the lines XVI—XVI, XVII—XVII, XVIII—XVIII and XIX—XIX in FIG. 15.
Figure 17:
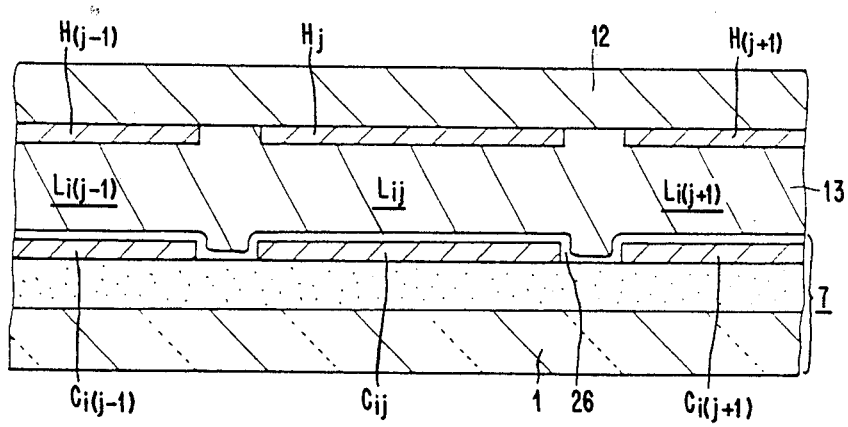
Figure 18:
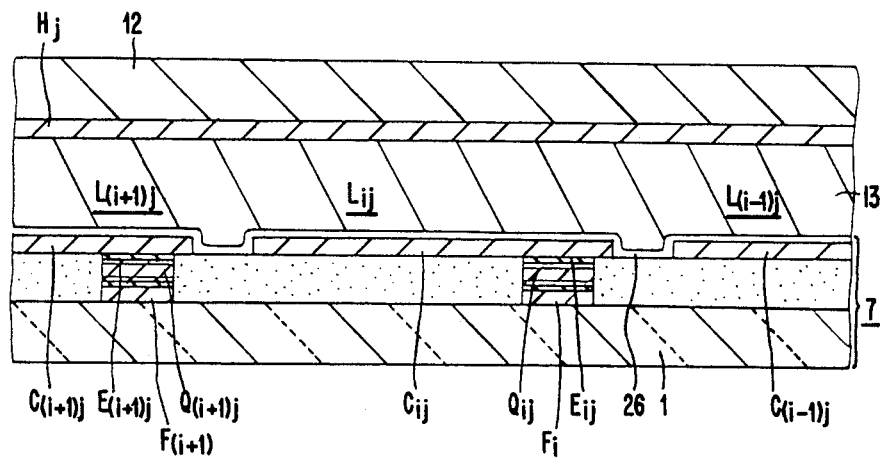
Figure 19:
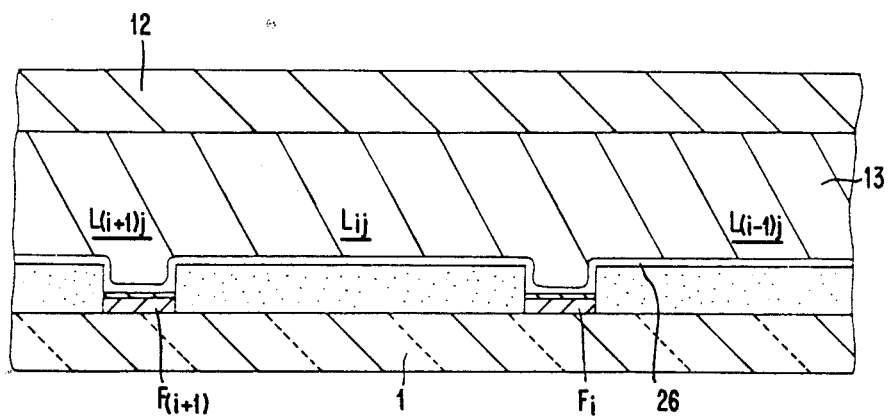
Figure 20:
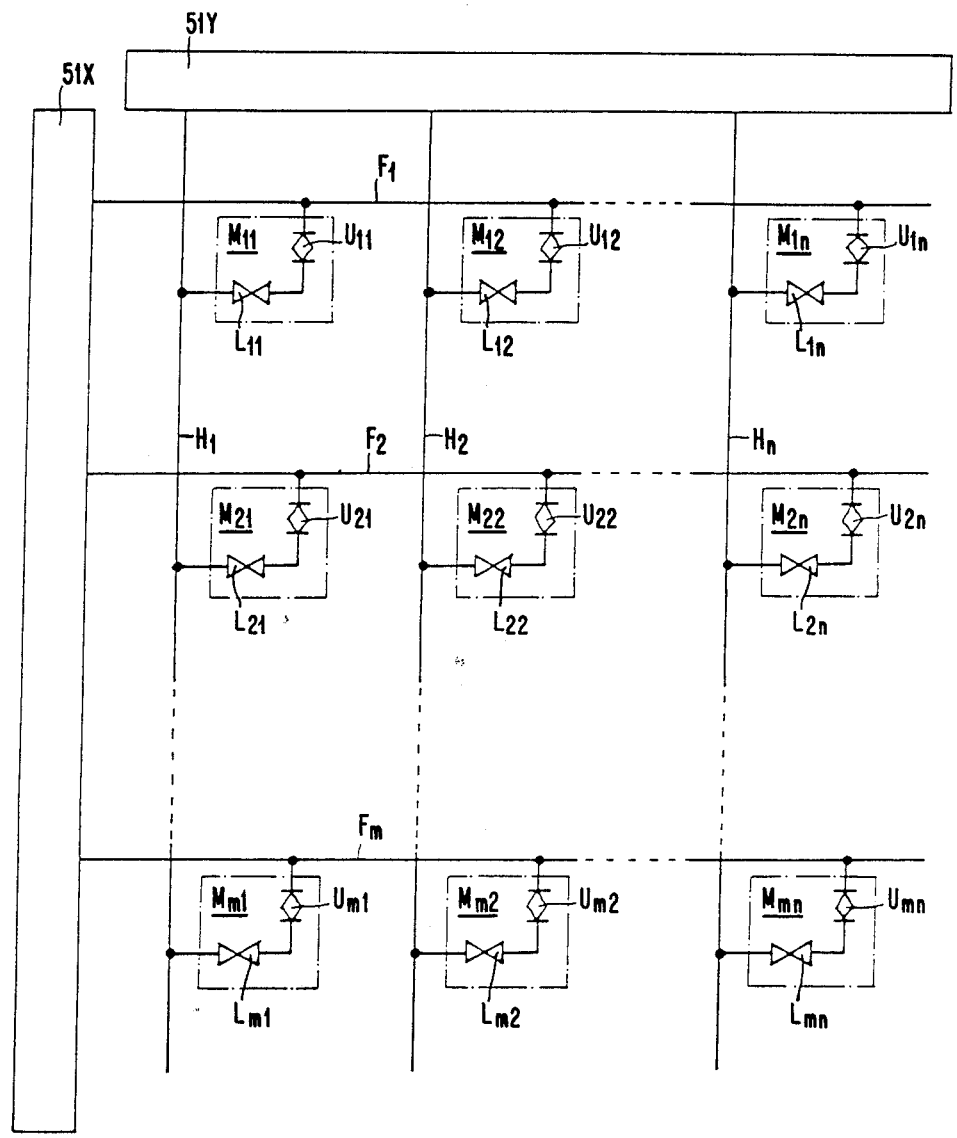
FIG. 20 is an electrical connection diagram of the liquid crystal display panel of the present invention shown in FIGS. 15 to 19.
Figure 21A:
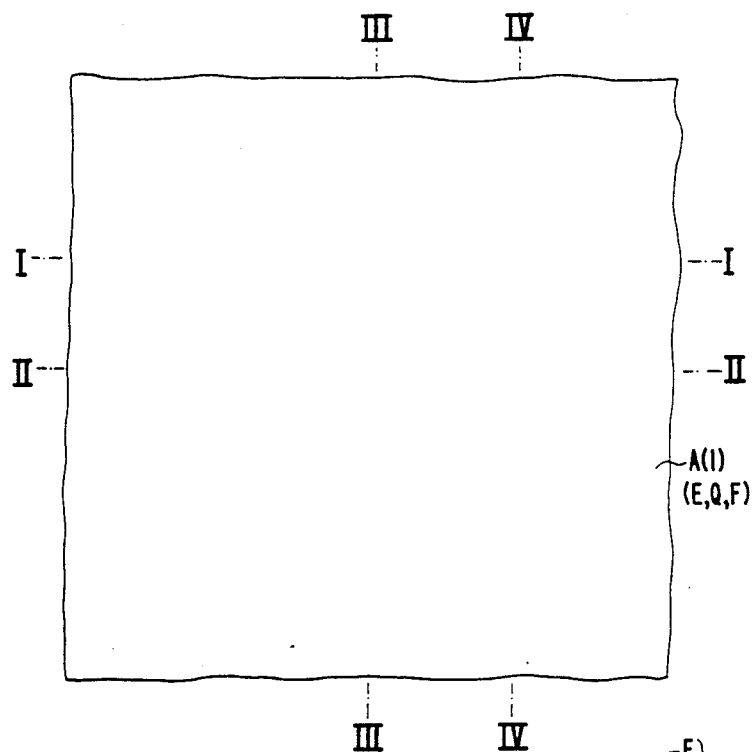
FIGS. 21 to 26 are diagrams for explaining the manufacture of the liquid crystal display panel shown in FIGS. 15 to 19 by the method of the present invention.
Figure 21B:
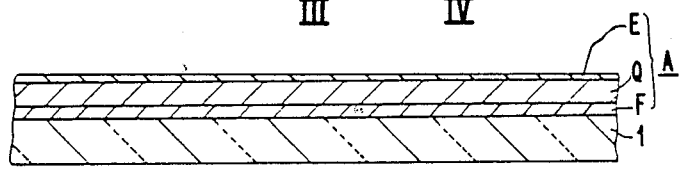
Figure 21C:
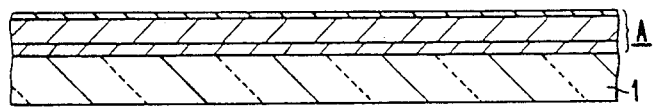
Figure 21D:
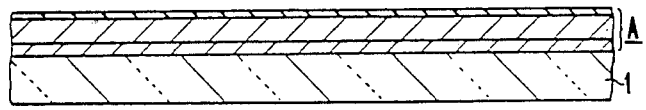
Figure 21E:
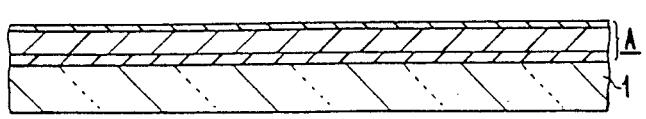
Figure 22A:
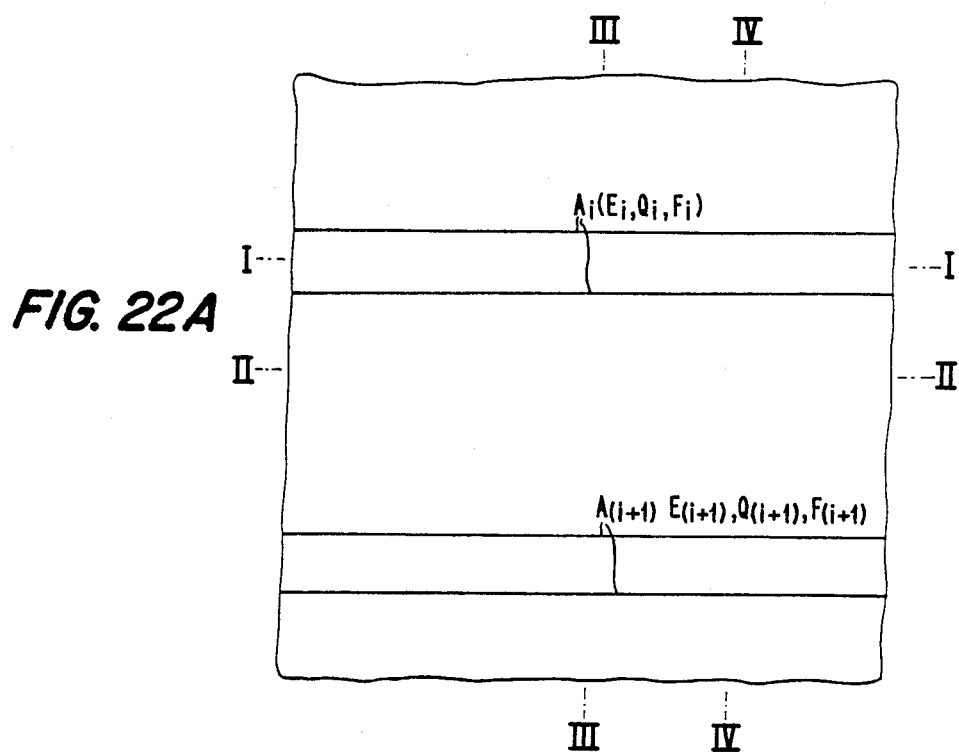
Figure 22B:
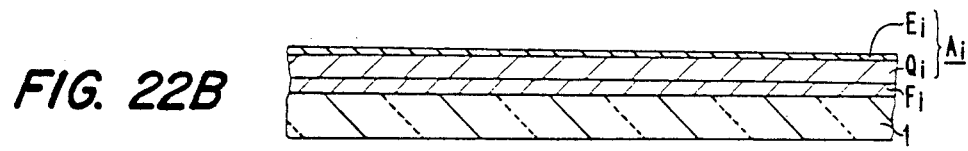
Figure 22C:
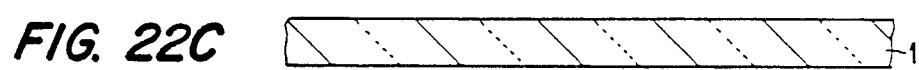
Figure 22D:
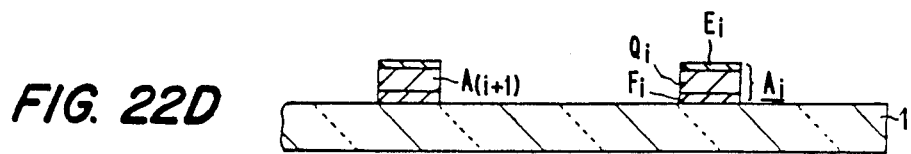
Figure 22E:
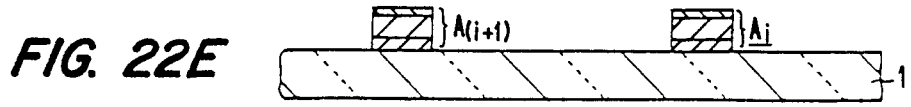

Therefore, according to the arrangement described above in connection with FIGS. 1 to 5, since the liquid crystal element $L_{ijr}$ can be controlled to be transparent or nontransparent, respectively, by applying, through use of row and column decoders 51X and 51Y, across the liquid crystal display device $M_{ij1}$, $M_{ij2}$ and $M_{ij3}$ via the conductive layers $F_i$ and $H_{j1}$, $F_i$ and $H_{j2}$, and $F_i$ and $H_{j3}$ red, as shown in FIG. 8, green and blue drive signals a color display can be provided.

Accordingly, the liquid crystal display panel shown in FIGS. 1 to 5 can be provided a color image display.

FIG. 15 to 19 illustrate another embodiment of the liquid crystal display panel of the present invention.

In FIGS. 15 to 19 like parts corresponding to those in FIGS. 1 to 5 are identified by the same reference numerals and no detailed description will be given of them.

The liquid crystal display panel shown in FIGS. 15 to 19 has the same construction as depicted in FIGS. 1 to 5 except the following points:

The insulating layers $K_{i1}$ to $K_{in}$ and $K_{(i+1)1}'$ to $K_{(i+1)n}'$ in FIGS. 1 to 5 are substituted with a insulating layer $K_i$. The insulating layer $K_i$ extends between the laminate members $A_{i1}$ to $A_{in}$ and $A_{(i+1)1}$ to $A_{(i+1)n}$ and substantially flush therewith, therefor the conductive layer $C_{ij}$ is formed on the ensulating layer $K_i$ and extends onto the laminate member $A_{ij}$ and the insulating layer $K_{(i-1)}$.

Further, the column conductive layer $H_{i1}$, $H_{j2}$ and $H_{j3}$ in FIGS. 1 to 5 are substituted with a column conductive layer $H_j$, and therefor the liquid crystal display device $M_{ij1}$, $M_{ij2}$ and $M_{ij3}$ are substituted with a liquid crystal display device $M_{ij}$.

Furthermore, the filters $S_{11}$ to $S_{n1}$, $S_{12}$ to $S_{n2}$ and $S_{13}$ to $S_{n3}$ are omitted.

According to the arrangement described above with respect to FIGS. 1 through 5, the electrode $B_{ijr}$ of the liquid crystal element $L_{ij}$ and the electrode $D_{ij}'$ of the nonlinear element $U_{ij}$ are common each other. The electrode $V_{ij}'$ of the liquid crystal elements $L_{1j}$ of the liquid crystal display devices $M_{ij}$ as connected to the column conductive layer $H_j$ and the electrode $D_{ij}$ of the nonlinear element $U_{ij}$ is connected to the conductive layer $F_i$. Therefore, according to the arrangement described above in connection with FIGS. 15 to 19, since the liquid crystal element $L_{ij}$ can be controlled to be transparent or nontransparent, respectively, by applying, through use of row and column decoders 51X and 51Y, across the liquid crystal display device $M_{ij}$, $M_{ij}$ and $M_{ij}$ via the conductive layer $F_i$ and $H_j$ drive signal a monocolor display can be provided.

Accordingly, the liquid crystal display panel shown in FIGS. 1 to 5 can be provided a monocolor image display.

The substrate member 7 dipicted in FIGS. 15 to 19 can be manufactured, for example, as follows:

A conductive layer F which will ultimately form the conductive layers $F_1$ to $F_n$, a layer laminate member which will ultimately form the layer laminate members $Q_{11}$ to $Q_{mn}$ and a conductive layer E, which will ultimately form the conductive layers $E_{11}$ to $E_{mn}$ are deposited in that order on the substrate 1, as shown in FIGS. 21A to 21E in the case with the example shown FIGS. 9A to 9E. The conductive layer F, the non-single-crystal semiconductor layer Q and the conductive layer E make up a active layer member A which will ultimately form the active layer member $A_{11}$ to $A_{mn}$ as described previously.

Next, the active layer member A is subjected to a known pattern process using a first mask, providing m layer members $A_1$ to $A_m$ of the same pattern as the conductive layers $F_1$ to $F_m$, as shown in FIGS. 22A to 22E, as is the case with the example shown in FIGS. 10A to 10E.

Next, a insulating layer K of photo resist which will ultimately form the insulating layer $K_i$ is deposited by a known method, for example, a plasma CVD method on the entire surface of the substrate 1 to cover the layers $A_1$ to $A_m$, as shown in FIGS. 23A to 23E.

Figure 23A:
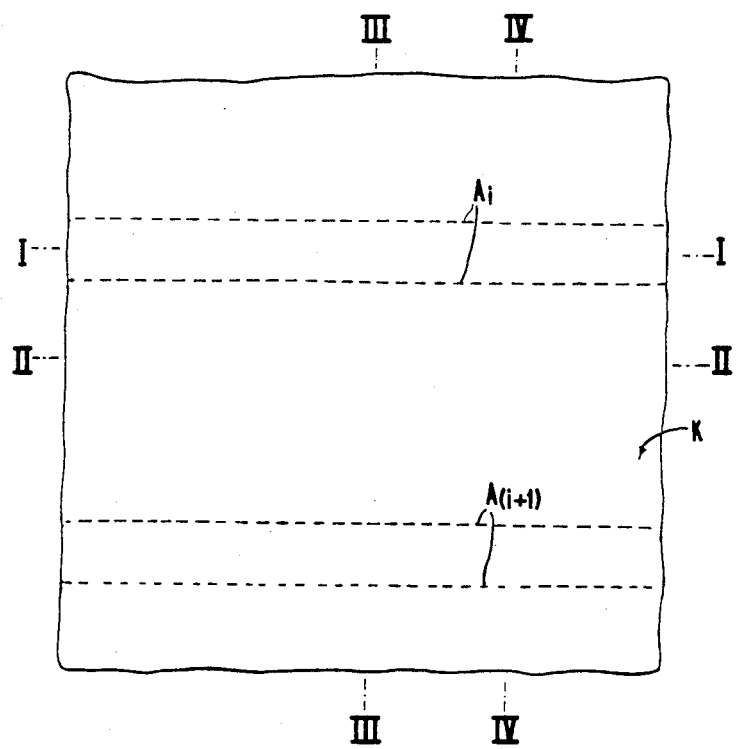
Figure 23B:
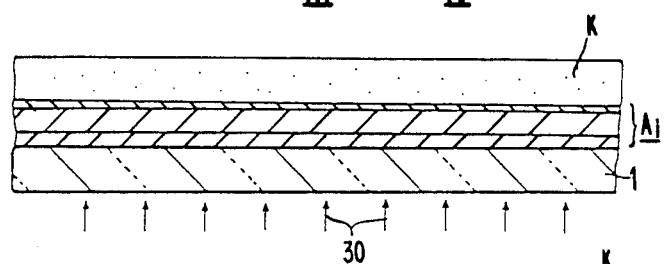
Figure 23C:
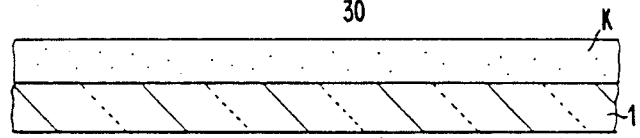
Figure 23D:
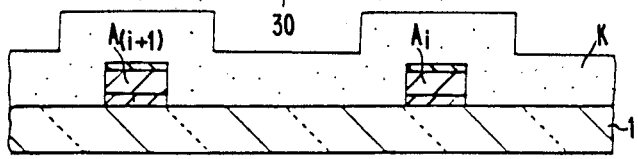
Figure 23E:
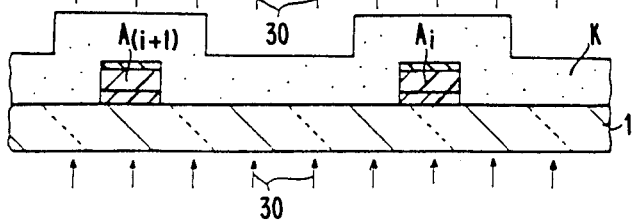
Figure 24A:
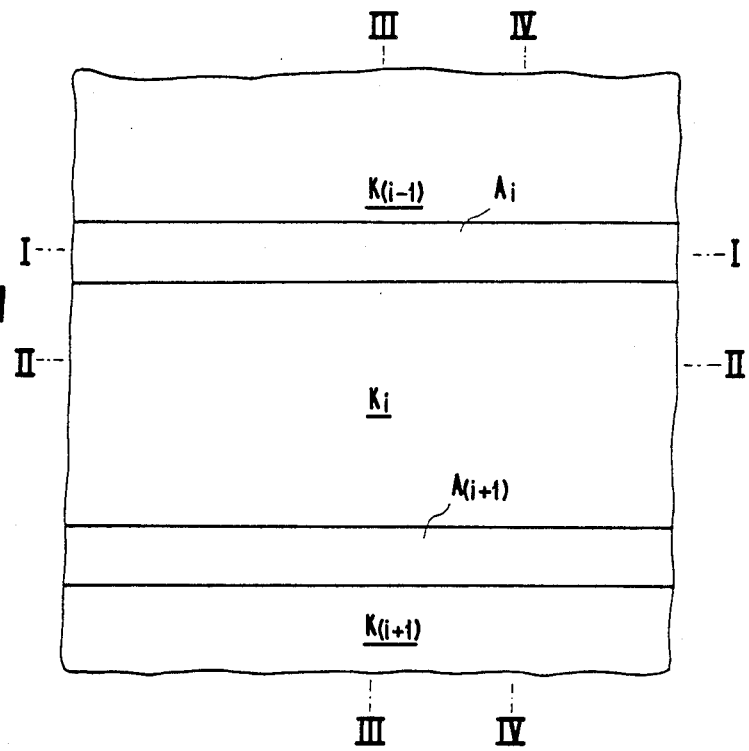
Figure 24B:
Figure 24C:
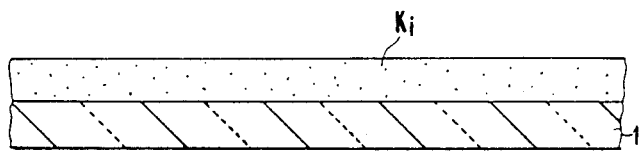
Figure 24D:
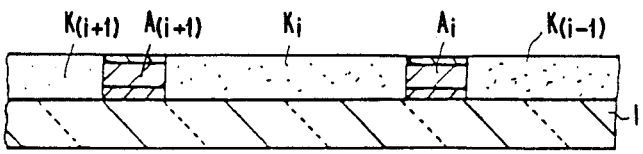
Figure 24E:
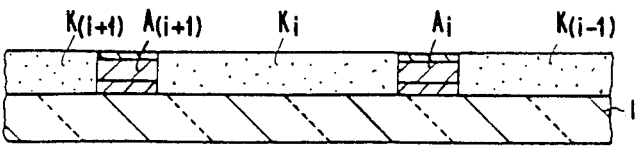
Figure 25A:
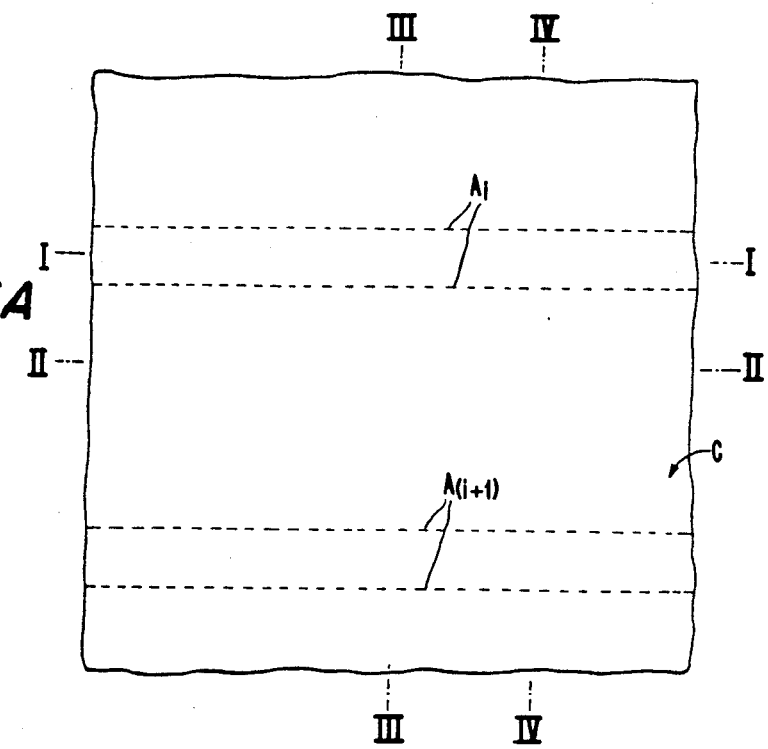
Figure 25B:
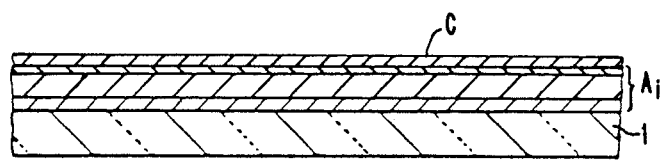
Figure 25C:
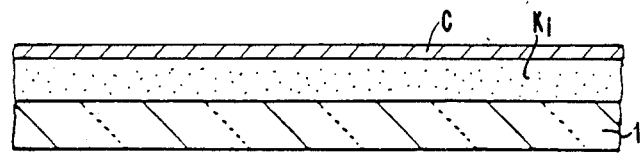
Figure 25D:
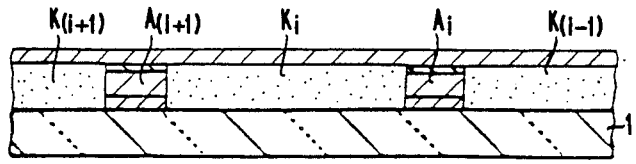
Figure 25E:
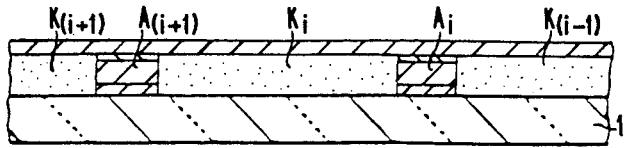
Figure 26A:
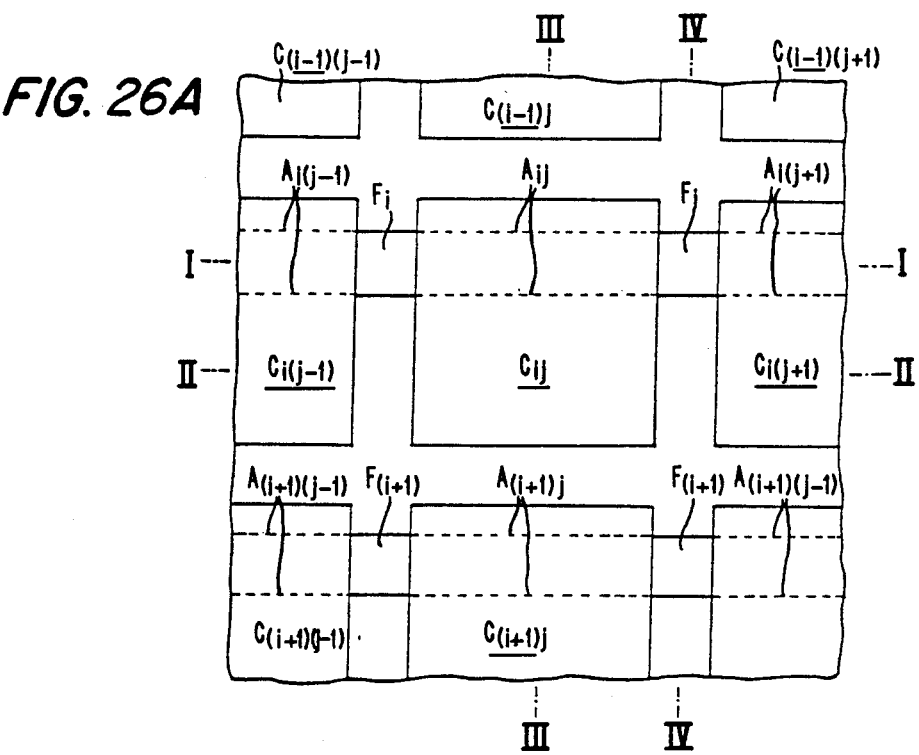
Figure 26B:
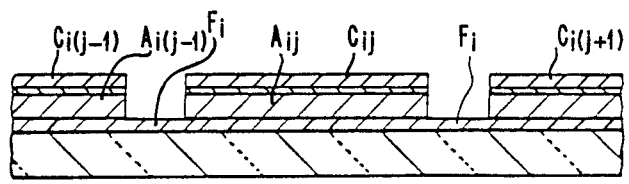
Figure 26C:
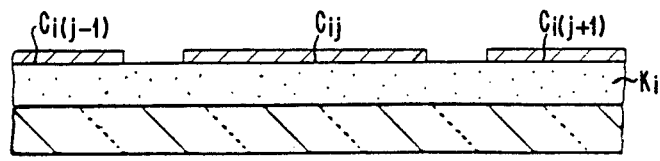
Figure 26D:
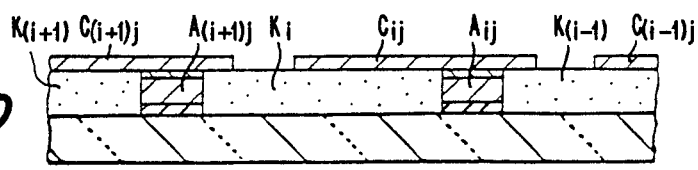
Figure 26E:
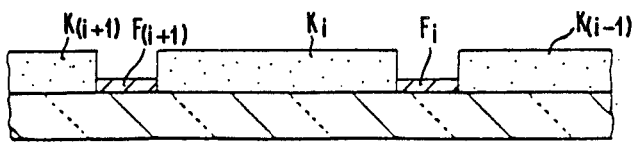

Next, the insulating layer K is irradiated by light 30 without using any mask as shown in FIGS. 23A to 23B and then is developed into the insulating layer $K_i$, as shown in FIGS. 25A to 24E.

Next, a conductive layer C is diposited on the entire area of the substrate 1 to cover the laminate member $A_1$ to $A_m$ and the insulating layer $K_1$ to $K_m$ as shown in FIGS. 25A to 25E.

Next, the conductive layer C, the conductive layers $E_1$ to $E_m$ and the layers $Q_1$ to $Q_m$ of the layer member $A_1$ to $A_m$ are patterned by a known method using a second mask into the conductive layers $C_{11}$ to $C_{mn}$, the layers $Q_{11}$ to $Q_{mn}$ and the conductive layers $E_{11}$ to $E_{mn}$ of the layer member $A_{11}$ to $A_{mn}$, as shown in FIGS. 26A to 26E.

Next, the thin insulating layer 25 is deposited on the entire surface of the substrate 1 to cover the conductive layers $C_{11}$ to $C_{mn}$, the layer members $A_{11}$ to $A_{mn}$, the insulating layers $K_1$ to $K_m$ and the parts of the conductive layers $F_1$ to $F_m$ which are not covered with the conductive layers $C_{11}$ to $C_{mn}$.

It will be apparent that the above embodiment should be construed as merely illustrative of the present invention and should not be construed as limiting the invention specifically thereto and that various modifications and variations may be effected without departing from the scope of the novel concepts of the invention.

What is claimed is:

1. A method for manufacturing liquid crystal device comprising the step of:
   forming a semiconductor layer and an underlying conductive layer on a first substrate:
   removing both said semiconductor layer and said conductive layer, with a first mask, other than a plurality of separate portions in the form of strips;
   forming an overlying conductive layer over said semiconductor strips;
   removing both said overlying conductive layer other than a plurality of parts to be first electrodes arranged in an array and the underlying semiconductor, so that the conductive strips formed from said underlying conductive layer by said removing step of said overlying conductive layer and the underlying semiconductor remain as addressing lines for said liquid crystal device: and
   mating said first substrate with a second substrate having a plurality of second electrodes corresponding to said first electrodes, with a liquid crystal layer in between.

2. A method as claimed in claim 1, further comprising the step of insulating the side of the semiconductor strip.

3. A method as claimed in claim 1, wherein said array is formed in a matrix.

* * * * *